(No Model.) 2 Sheets—Sheet 1.

A. McDONALD.
COMBINED PLOW AND HARROW.

No. 335,082. Patented Jan. 26, 1886.

WITNESSES
W. N. Mortimer
Edward G. Siggers

INVENTOR
Alex. McDonald
By his Attorney
C. A. Snow & Co.

(No Model.) 2 Sheets—Sheet 2.
A. McDONALD.
COMBINED PLOW AND HARROW.
No. 335,082. Patented Jan. 26, 1886.
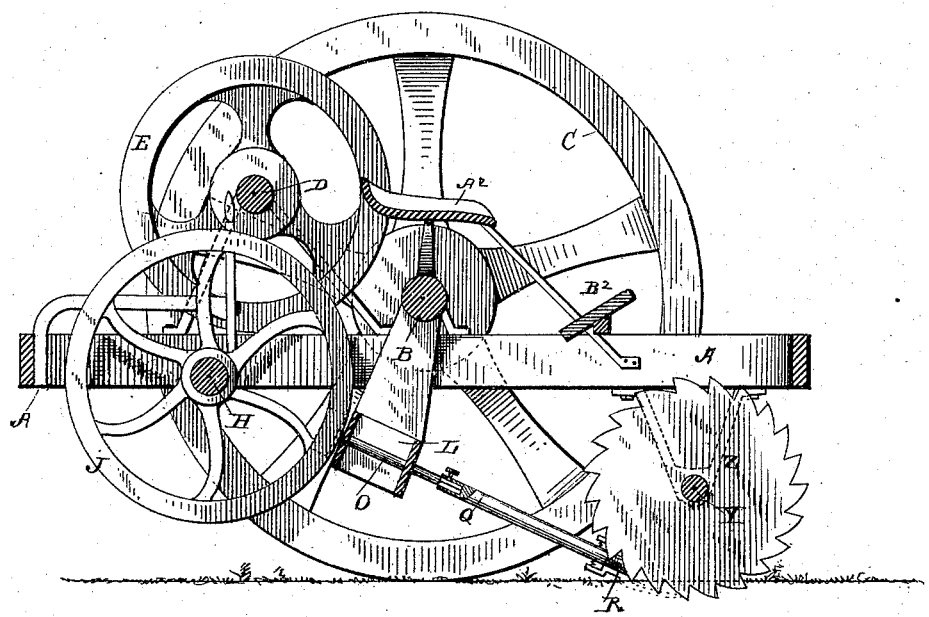
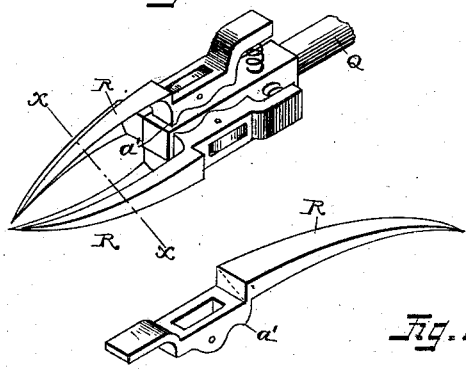
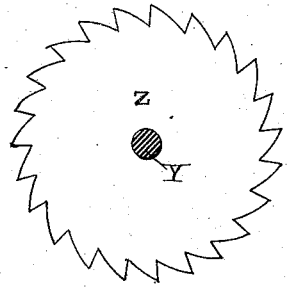
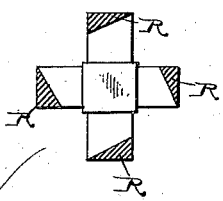
WITNESSES
W. W. Mortimer
E. G. Siggers
INVENTOR
Alexander McDonald
By his Attorneys
C. A. Snow & Co.

UNITED STATES PATENT OFFICE.

ALEXANDER McDONALD, OF CENTRALIA, ILLINOIS.

COMBINED PLOW AND HARROW.

SPECIFICATION forming part of Letters Patent No. 335,082, dated January 26, 1886.

Application filed October 5, 1885. Serial No. 179,032. (No model.)

*To all whom it may concern:*

Be it known that I, ALEXANDER MCDONALD, a citizen of the United States, residing at Centralia, in the county of Marion and State of Illinois, have invented a new and useful Improvement in a Combined Plow and Harrow, of which the following is a specification, reference being had to the accompanying drawings.

This invention relates to a combined plow and harrow; and the object of the improvement is to provide a machine which will in one operation turn up the ground and pulverize the soil, and thus place it in condition for immediate planting, as may be desired.

Heretofore in preparing the soil for planting it is usual to employ plows to break the soil into large lumps or clods, and subsequently to pulverize the clods by a harrow or clod-crusher to put the ground in the best condition for planting. By this course the farmer must provide himself with a machine suitable to perform each of the operations stated, and this, together with the time and labor expended in the working of the same, falls hard on the farmer, who is thereby taxed to the utmost in preparing his field to produce the best results. To avoid these objections, I provide a machine which will perform the several operations at one and the same time, causing the soil to be flaked off by a series of revolving cutters, the ground when thus treated being so fine as to obviate the necessity of any further preparation.

With these ends in view the said invention consists in certain details of construction and combination of parts, as hereinafter set forth, and particularly pointed out in the claims.

Figure 1:
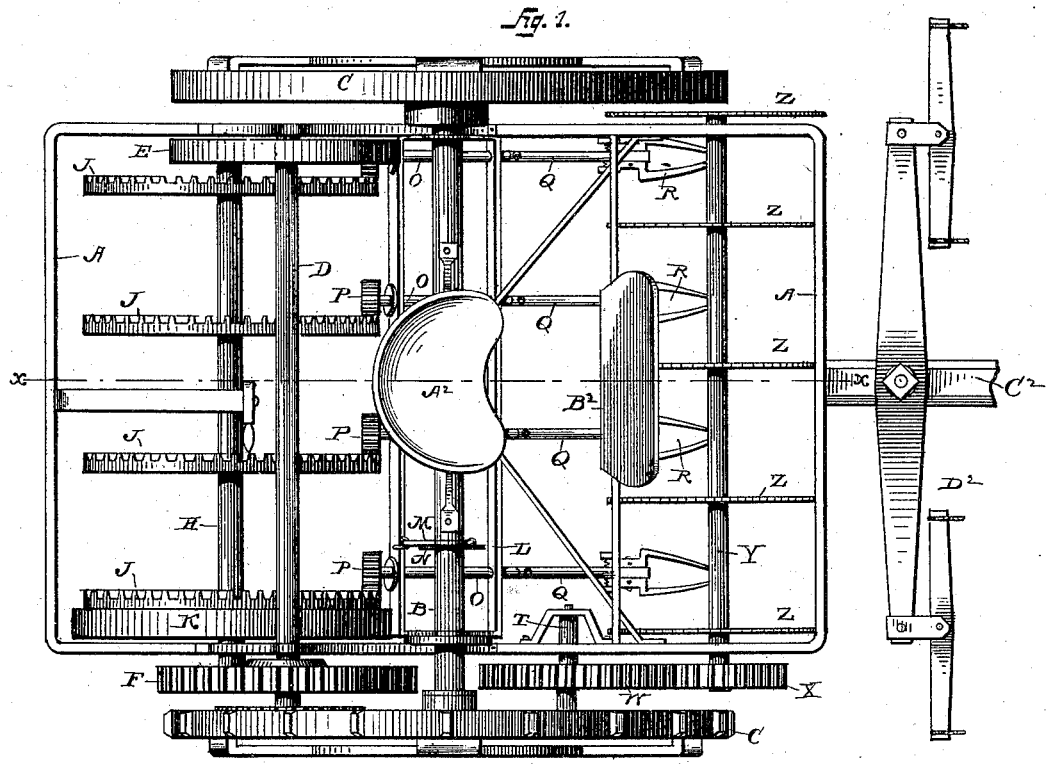
Figure 2:
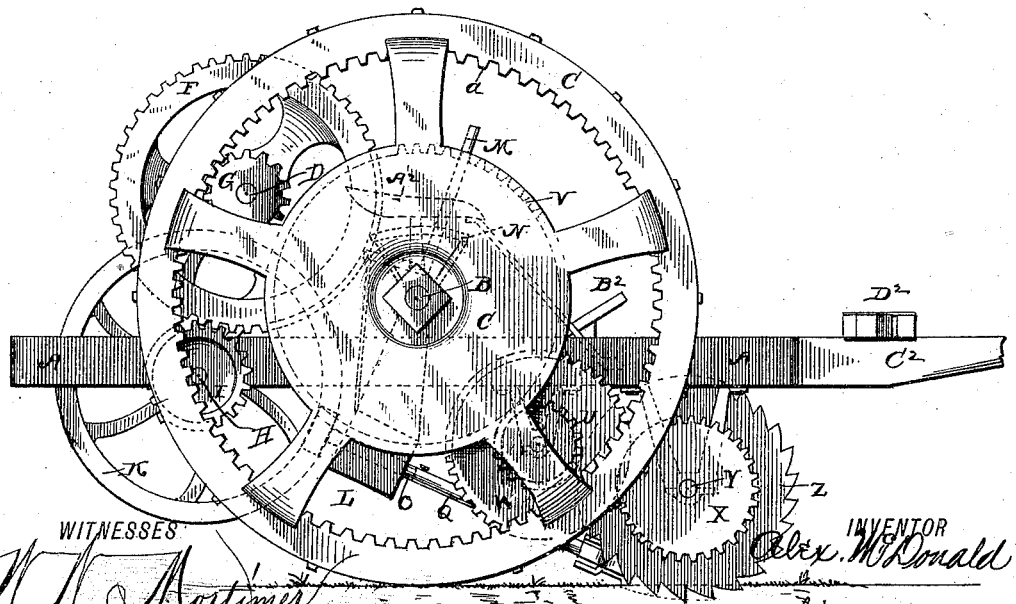

In the accompanying drawings, Figure 1 is a plan view of a machine embodying my improvements. Figs. 2 is a side elevation thereof. Fig. 3 is a longitudinal section on the line *x x*, Fig. 1. Fig. 4 is a detail view of one of the cutters. Fig. 5 is a detail view of one of the saws. Fig. 6 is a detail sectional view on the line *x x*, Fig. 4.

Like letters are used to indicate corresponding parts in the several figures.

Referring to the drawings, A designates the frame of the machine, of any suitable construction, and in which the axle B is supported. Either one or both of the wheels C C may be constructed like the usual traction-wheels on traction-engines, harvesters, &c., so as to engage more firmly with the ground. The inner circumference of one of the wheels C is provided with a series of teeth, *a*, by means of which power may be transmitted to the machine as the latter moves along.

D designates a shaft mounted in the upper end of the frame A, at the rear end of the machine, one end of the shaft having a fly or balance wheel, E, and the other end provided with a large gear-wheel, F, and a small pinion, G, which meshes with the teeth on the wheel C. A shaft, H, is mounted in the frame in rear of and below the shaft D, and is provided with a pinion, I, outside of the frame A, which meshes with the gear-wheel F. Within the frame the shaft H is provided with a series of equidistant gear-wheels, J J J J, and a fly or balance wheel, K, said shaft receiving its motion from the driving-wheel C through the pinion I and gear-wheel F.

L designates a supplemental frame for supporting the shafts of the horizontally-rotatable cutters or augers, said frame preferably consisting of two longitudinal bars, *l*, which are suspended from the axle by brackets or arms *l'*, and it is further provided with lugs or short shafts at its ends, that are pivoted in the frame, A, so as to oscillate or turn by the movement of a lever, M, working across the rack N in any suitable manner. Working transversely through the frame L are a series of shafts, O, corresponding in number to the gear-wheels J, the rear ends of the shafts being provided with pinions P, engaging the latter, and thereby causing the rotation of the shafts. The front ends of the latter are preferably squared to receive the square sleeves or openings formed in the rear ends of the shank Q of the cutters. By this construction the cutters may be detached at will for the purpose of sharpening or replacing them by others of larger or smaller size, set-screws being employed to hold the cutters in place while in use.

The cutters (shown in detail, Fig. 4) comprise a series of knives, R, pivoted at an intermediate point of their length to the shank Q, and curved inward at the front end toward a common center. Springs S bear against the shank or stem Q and the rear end of the knives, so as to retain the front ends thereof in proper position relative to each other, said springs yielding slightly as the knives work against the ground, and thus prevent injury to said knives. The shape of the knives is shown more clearly in the detail sectional view Fig. 6, one edge of each of the knives of the series being sharpened, so that all the cutting-edges face or extend in the same direction. Stop-lugs $a'$ are provided on the inner faces of the knives, to abut against the front end of the shank or stem Q, and thus limit the inward movement of the knives under the action of the springs.

It will be observed that the arrangement of the shafts O on an inclined line causes the front ends of the cutters to engage with the ground at an angle, the sharpened or cutting edges of the knives acting in succession against the ground to cut or slice the same as the machine moves along. It will also be seen that by the arrangement of the rack and lever connecting with the supplemental pivoted frame L the latter may be oscillated or turned on its bearings, to raise the cutters from off the ground when crossing a field or when an obstruction is reached.

T designates a short shaft mounted in bearings of the frame A, and provided with a pinion, U, meshing with a gear-wheel, V, formed on the hub of the driving-wheel C. (See Fig. 2.) The shaft T is also provided with a gear-wheel, W, which engages with a pinion, X, on the end of a revolving shaft, Y, which is mounted in the frame A in front of the cutters. A series of saws, Z Z Z Z Z, one more than the number of cutters, are fixed on the shaft Y, so as to come intermediately between and on each side of the cutters. The object of these saws is to work in the ground a certain depth in front of the cutters, and thus prepare the soil for the action of the same. The saws (shown in detail Fig. 5) are preferably circular in form, and provided with any suitable number and shape of teeth sufficient in size to work through the soil and partition off the same for the subsequent action of the cutters.

A seat, $A^2$, is mounted on the frame A to receive the driver, who is also provided with a foot rest or brace, $B^2$, as shown.

$C^2$ designates a tongue-bar, and $D^2$ the whiffle-tree, to which the horses are connected.

The operation of my invention will be readily understood from the foregoing description, taken in connection with the annexed drawings. As the machine moves along the ground, the drive or traction wheel C, on which the teeth $a$ are formed, actuates the pinion G and effects the rotation of the shaft D. The latter, through the gear-wheel F and pinion I, transmits motion to the shaft H, working the gear-wheels J, which drive the shafts O through the medium of the pinions P. Since the shanks or stems of the cutters are attached to the shafts O, the rotation of the latter causes the cutters to revolve at one and the same time. Simultaneously with the movement of the machine motion is imparted to the revolving shaft Y, through the medium of the gears W X, and as said shaft carries the saws the latter are caused to work in the ground to any depth desired, the teeth of the saws acting upon the soil, cutting a deep kerf or furrow as the machine travels over the field. As will be seen, the arrangement of the saws causes the same to cut in parallel lines forward of and on each side of the cutters, each of the latter working between two of the furrows made by the saws. The function of the saws is to partition off the ground and partly prepare the same for the action of the cutters, thereby taking some of the work off of them, and enable the machine to work with greater ease. Since each of the cutters works in the space of ground inclosed by two of the cutters, it is the office of each cutter to prepare the soil which has been partitioned or cut off for it to do. The long deep furrow on each side renders the action of the cutter to be made easier, for as the knives of the cutters act against the soil a sufficient slice will be cut by each knife between each furrow, the continued action of the cutters effecting the preparation of the ground to the various depths desired. Ordinarily, I propose to set the saws so as to cut through the soil a continuous kerf or furrow the depth of which will be the depth of the ground which it is intended for the cutters to prepare.

It will be observed that the cutters are inclined, so that the front end thereof will cut lower and deeper in the ground than the rear end. By this means the front end of the cutters, where the knives come close together, penetrates the ground, slicing off the soil as it passes inward or downward, and the enlarged rear end of the knives continuing the action and spreading out the soil in thin slices between each furrow made by the saws. It will also be seen that the revolving action of the cutters causes the top portion of the slice made by each knife to be thrown over to expose the bottom portion, and thus grass, weeds, and the like growing above the ground will be turned under for the purpose well known. Should either one of the cutters strike an obstruction, such as a stone, the knives will yield outward to avoid injury thereto, and then spring back into position.

It will be apparent that by slicing off the ground by the action of cutters described each slice will be broken or pulverized by the continued revolving of the cutters, so that as the machine leaves each section of the land the same will appear as if it had been harrowed, the broken or pulverized soil being distributed evenly over the field, so as to avoid any further preparation before planting. In this manner I avoid the necessity of using a harrow or clod-crusher to break the clods or hard lumps and "even off" the field, for the cutters thoroughly slice off and pulverize and distribute the broken soil over the face of the field. Thus my improved machine not only saves the expense of such other machines as have been used heretofore, but it also saves the time, trouble, and labor of using the same, which is the main point to consider.

Of course I do not limit myself to any particular form of cutters or saws, as such may be varied at will without departing from the spirit or scope of the present invention. For instance, I may use the old form of twist-augers to serve as cutters, the soil at the bottom being carried along the twists and deposited at the top; but for all practical purposes I prefer to use the form of cutters shown and described. Furthermore, I do not wish to be limited to any particular number of cutters or saws, as such may be changed at will to suit the wishes of the manufacturer.

Machines may be constructed to prepare a wide field for planting by increasing the number of saws and cutters.

The shaft H, on which the pinion I is mounted, may be supported loosely within the frame A, so as to be shifted laterally by the movement of a lever to throw the said pinion I into or out of engagement with the gear F. I have partly shown the means of connection by which this result may be attained, but do not wish to be limited to the same, for any suitable connection may be supplied to effect the same result.

My improvement is simple in its construction, effective in its operation, and will prove of great utility for the purposes intended.

Having described my invention, I claim—

1. In a combined plow and harrow, the combination of a main frame, a series of saws rotating in vertical planes for cutting parallel kerfs or furrows in the ground, and inclined cutters or augers rotating in horizontal planes and arranged in rear and to one side of the saws, for acting upon the soil between the saws, substantially as described.

2. In a combined plow and harrow, the combination of a main frame, a series of saws revolving in vertical planes, and horizontally-rotatable cutters or augers vertically adjustable independently of the saws, substantially as described.

3. In a combined plow and harrow, the combination of a main frame, the drive-wheels, a series of vertically-revolving saws, a series of horizontally-rotatable augers or cutters, each having a series of pivoted spring-actuated blades, and intermediate gearing between the auger and saw shafts, and the drive-wheels for simultaneously rotating the shafts, substantially as described.

4. The combination of a frame, the drive-wheels, a series of horizontally-rotatable augers geared to the drive-wheels, and each comprising a shank and two or more spring-pressed blades pivoted on the shank, substantially as described.

5. The combination of a frame, a series of augers journaled therein, and gearing for rotating the augers in horizontal planes simultaneously, each auger comprising a shank and two or more spring-actuated blades pivoted on the shank and curved at their front ends to a common center, substantially as described.

6. In a combined plow and harrow, the combination of a main frame, the drive-wheels, a series of saws revolving in vertical planes and having their shaft geared with one of the drive-wheels, a supplemental frame arranged below and secured to the main frame, a shaft, H, geared with the drive-wheels, and a series of cutters or augers journaled in the supplemental frame and geared with the shaft H, the augers being rotated simultaneously in horizontal planes and arranged in rear and to one side of the vertically-revolving saws, substantially as described.

7. In a combined plow and harrow, the combination of the following elements: a main frame, the drive-wheels, a shaft, Y, provided with a series of saws and journaled in the main frame, a shaft, T, geared with one of the drive-wheels, shafts D H, journaled in the main frame and geared together, a supplemental frame, L, pivoted in the main frame, a lever for elevating or depressing the pivoted frame, and a series of augers journaled in the supplemental frame and geared with the shaft H, the whole combined and arranged substantially as described.

In testimony that I claim the foregoing as my own I have hereto affixed my signature in presence of witnesses.

ALEXANDER McDONALD.

Witnesses:
W. NELSON MOORE,
PHILIP MAURO,
E. G. SIGGERS.